United States Patent [19]
Zhang et al.

[11] Patent Number: 6,018,734
[45] Date of Patent: Jan. 25, 2000

[54] MULTI-DIMENSIONAL PATTERN ANALYSIS

[75] Inventors: Tao Zhang, Ann Arbor, Mich.; K. R. Raghavan, San Jose, Calif.

[73] Assignee: Triada, Ltd., Ann Arbor, Mich.

[21] Appl. No.: 09/162,187

[22] Filed: Sep. 28, 1998

Related U.S. Application Data

[60] Provisional application No. 60/060,376, Sep. 29, 1997.

[51] Int. Cl.$^7$ .................................................. G06F 17/30
[52] U.S. Cl. ............................................................ 707/3
[58] Field of Search .................................. 707/6, 1, 2, 3, 707/4, 5

[56] References Cited

U.S. PATENT DOCUMENTS

| | | | |
|---|---|---|---|
| 5,018,075 | 5/1991 | Ryan et al. ............................... | 706/46 |
| 5,245,337 | 9/1993 | Bugajski et al. ......................... | 341/51 |
| 5,293,164 | 3/1994 | Bugajski et al. ......................... | 341/51 |
| 5,592,667 | 1/1997 | Bugajski .................................. | 395/613 |
| 5,659,725 | 8/1997 | Levy et al. ............................... | 707/3 |
| 5,692,171 | 11/1997 | Andres ..................................... | 707/1 |
| 5,809,499 | 9/1998 | Wong et al. .............................. | 707/6 |
| 5,832,182 | 11/1998 | Zhang et al. ............................. | 707/101 |

*Primary Examiner*—Jack M. Choules
*Attorney, Agent, or Firm*—Gifford, Krass, Groh, Sprinkle, Anderson & Citkowski, PC

[57] ABSTRACT

A pattern recognition method applicable to unique associated pattern recognition in a structured information system or structured database is presented. The process may be used to find patterns in a column which are associated with unique data values in another column, or to find the number of unique values in the second column which are paired with the same associated pattern in the first column. The technique is easily extended to more general cases in which both the condition field and the associated pattern field may be two groups of fields.

6 Claims, 2 Drawing Sheets

MULTI-DIMENSIONAL PATTERN ANALYSIS

REFERENCE TO RELATED APPLICATION

This application claims priority of U.S. provisional application Ser. No. 60/060,376, filed Sep. 29, 1997, the entire contents of which are incorporated herein by reference.

FIELD OF THE INVENTION

The present invention relates generally to computer databases, including structured information systems and associative memory databases and, in particular, to processes for identifying unique patterns among fields within applicable database structures.

BACKGROUND OF THE INVENTION

As set forth in commonly assigned U.S. Pat. Nos. 5,245,337, 5,293,164, and 5,592,667, a multi-dimensional approach has been developed for transforming an unstructured information system into a structured information system. This approach addresses the unique properties of multiple information source systems, including database systems, from an information point of view. In particular, this new methodology attempts to unify the two fields of information theory and database by combining the encoding compression theory and the database theory for general data manipulations into a general information manipulation theory with respect to multi-dimensional information space.

Broadly, multiple information sources are described by different information variables, each corresponding to one information source or information stream. Information manipulations are primarily index manipulations which are, in general, more efficient than non-index manipulations of the same number. The only non-index manipulations are carried out at leaf nodes where unique data values are stored. Therefore, the non-index manipulations are minimized. As a further aspect of this approach, a structured information system or database is built by taking into account information relations between different sets of data in the database. Such relations between neighboring nodes are easily analyzed and presented on-line because they are built into the structure. Relations between nodes that are not neighbors are not explicitly built into the existing structure. On-line analysis of these relations requires efficient information manipulations in main memory.

The approach models multiple information sources as different information variables, wherein each variable corresponds to one information source or information stream. In accordance with the methodology, information variables at leaf nodes of an associative memory database structure assume unique data values. The resulting structured database makes it easy to obtain statistical information about the data stored in the database. However, only a limited amount of statistic information can be readily presented once a given tree structure is built. For example, whereas it is trivial to show double patterns formed from two leaf nodes which happen to be the two child nodes of the same double pattern internal node in an existing tree structure, it is non-trivial to show similar double patterns formed from two leaf nodes that have an immediate common ancestor node which is not a double-pattern node in the existing tree structure.

SUMMARY OF THE INVENTION

The present invention may be used to solve problems of the type just described in a general way in a structured information system or an associative memory database (AMDB). As one example of many, the process may be used to find patterns in a column which are associated with unique data values in another column, or to find the number of unique values in the second column which are paired with the same associated pattern in the first column. The technique is easily extended, however, to more general cases in which both the condition field and the associated pattern field may be two groups of fields.

In a more particular sense the invention addresses the association of conditional patterns in a field or a single information source with different data values in another field or information source. The first field or information source may be characterized as an associated pattern field, and the second is a condition field. In such a case the invention may be used to determine unique conditional patterns and counts which represent the number of unique data values in the condition field, that are associated with the same unique conditional pattern. The invention finds particular utility in structured information systems, wherein the fields correspond to leaf nodes of a tree structure.

BRIEF DESCRIPTION OF THE DAWINGS

FIG. 1 shows a process to recall tokens of node a at node $n_1$ that is the left child node of node $n_a$ which is the immediate ancestor node of leaf nodes a and b, and recall of tokens of node a at node $n_r$ that is the right child node of node $n_a$. Solid lines represent relationships between a parent node and its child nodes. Dashed lines indicate relationships between a leaf node and its ancestor node. $a_1, a_2, a_3, \ldots$ are tokens of node a while $A_1, A_2, A_3, \ldots$ are data values of node a. $b_1, b_2, b_3, \ldots$ are tokens of node b while $B_1, B_2, B_3, \ldots$ are data values of node b. $l_1, l_2, l_3, \ldots$ are tokens of node $n_l$. $r_1, r_2, r_3, \ldots$ are tokens of node $n_r$.

FIG. 2 shows a schematic of the steps of a preferred embodiment of the present invention.

DETAILED DESCRIPTION OF THE INVENTION

Figure 1:
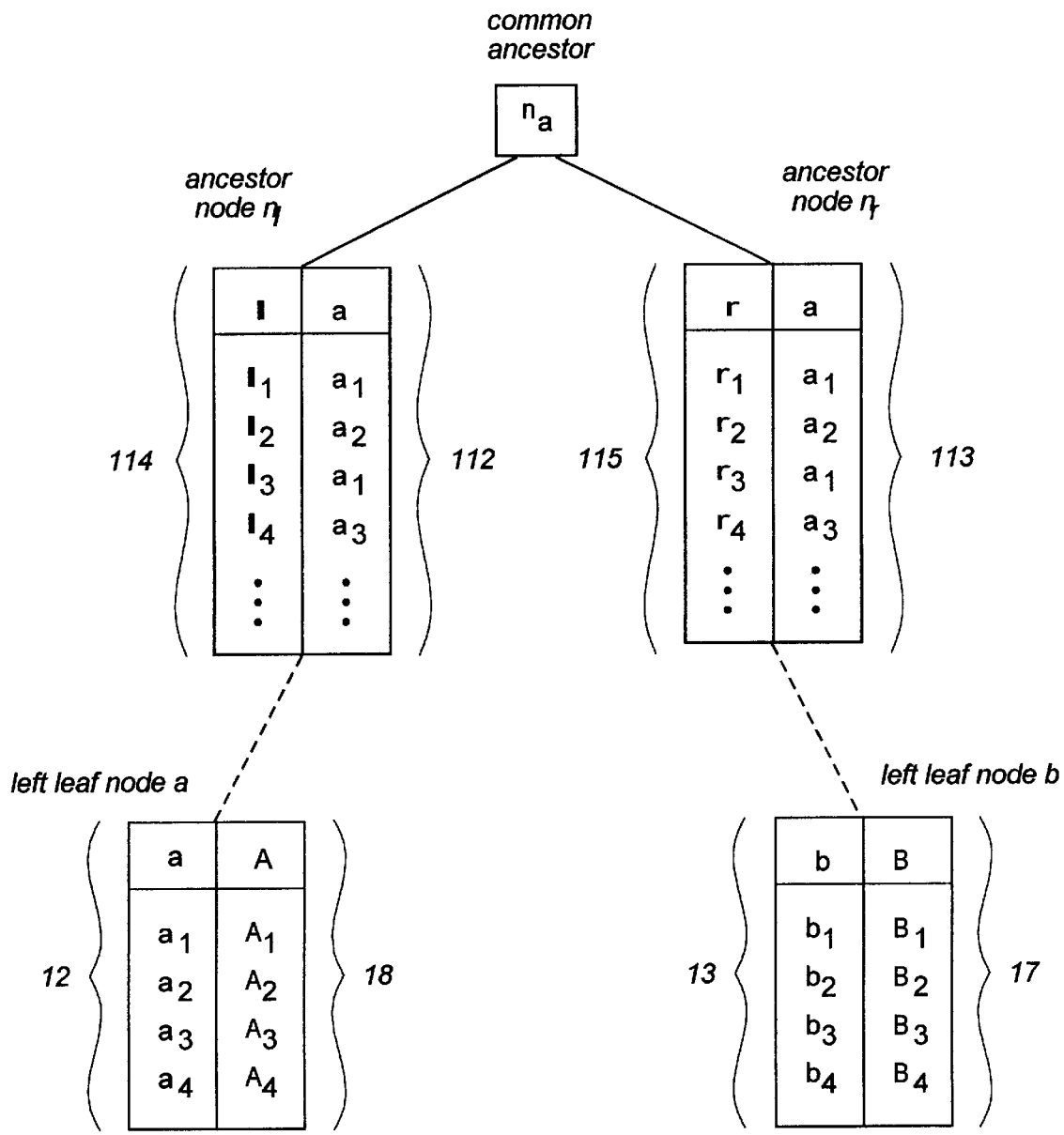

This invention resides in the solution to certain classes of problems that occur in structured information systems, including associative memory databases (AMDBs). One typical, interesting problem adopts the following form: Referring to FIG. 1, assume some patterns exist in a field $a_1$ or a column, wherein each pattern is associated with a unique data value in a different field $b_2$, or each pattern is made up of a set of data values in field $a_1$, all of which pair with the same data value in field $b_2$. Given this assumption, find out all the unique patterns and counts representative of a unique data value in field $b_2$ that pairs with the same pattern in $a_1$.

Although it is difficult to identify such patterns, the solution to this problem is quite interesting in many databases. For example, consider an automobile warranty database containing a vehicle ID field and an option code field, where each field value in the option field corresponds to an option associated with a vehicle identified by its vehicle ID. A vehicle may have many different options, and a complete set of options associated with each vehicle ID is an option pattern or option package. The problem here is to determine all the unique option packages and the number of vehicles that have the same pattern or package. Such pattern recognition may help to identify popular packages and to eliminate those unpopular packages or those with low counts from an assembly line.

Broadly, then, problems of this kind have to do with the association of conditional patterns in a field or a single information source with different data values in another field or information source. The first field or information source may be characterized as an associated pattern field, and the second is a condition field. The goal is to find all the unique conditional patterns and counts which represent the number of unique data values in the condition field, that are associated with the same unique conditional pattern.

To solve the problem, consider two given fields or information sources in an existing tree structure as shown in FIG. 1. Assume field $a_1$ is the condition field and field $b_2$ is the associated pattern field. In a structured information system, these fields correspond to two leaf nodes, a and b. The difference between the two fields $a_1$ and $b_2$ and two leaf nodes a and b is that the two fields are two unstructured information sources which may have redundant information values or data values, and the two leaf nodes are unique information sources which have only unique information values or unique data values.

First, we find the immediate common ancestor node $n_a$ of the two leaf nodes a and b in the existing tree structure. Assume further that the left child node of the common ancestor node $n_a$ is $n_1$, an ancestor node of node a, but not of node b. Similarly, the right child node $n_r$ of the ancestor node is an ancestor node of node b, but not of node a.

Now, we recall the tokens of node a 12 at node $n_1$ 14, and recall the tokens of node b 13 at node $n_r$ 15. This procedure propagates the a tokens 12 to node n, and the b tokens 13 to node $n_r$. The memory tokens of node $n_1$ 14 are replaced by the recalled tokens of node a 12 and the tokens of node $n_r$ 15 are replaced by the tokens of node b 13.

Figure 2:
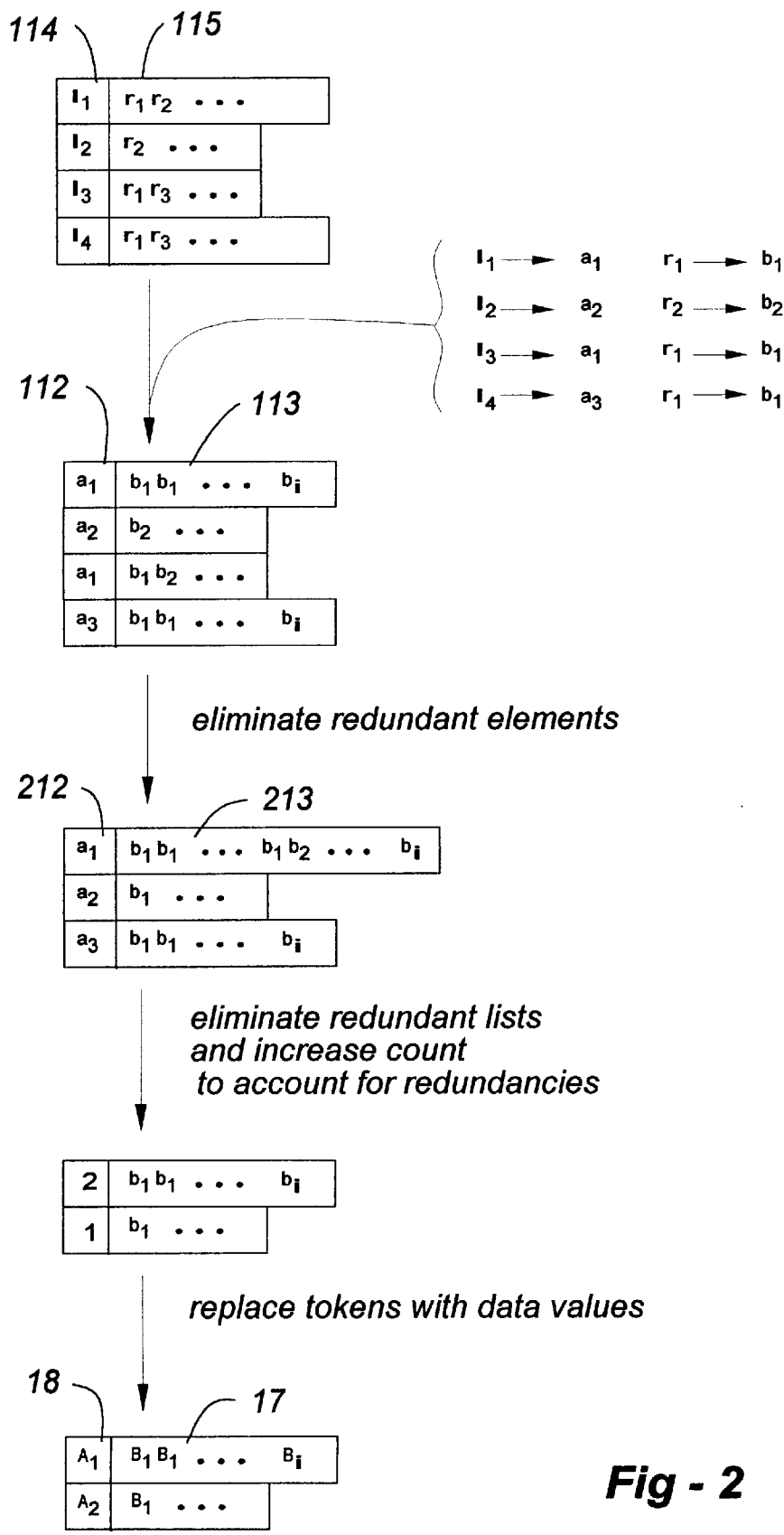

Referring now to FIG. 2, the memory structure of the ancestor node $n_a$ is loaded using the left hashing lists (right hashing lists if the right child node of the common ancestor node is an ancestor node of the condition leaf). In the left hashing structure, a set of lists are built. Each list has a left child token 114 as its list index and stores a set of right child tokens 115 as list elements. Any given list represents pairing between the left child token or the list index 114 and the right child tokens 115 stored in the list.

The list indices are then replaced by the corresponding tokens of node a 112 and replace the list elements by the corresponding tokens of node b 113, anticipating some redundant list indices and list elements in the general case. The lists that have the same list index or that pair with the same token of node a 112, are combined to eliminate redundant elements in each new list, and sort the remaining elements. At this point, we have a set of lists 213 which all have unique list indices 212. Some lists may store a set of the exact same tokens, although they have different list indices.

Two interesting problems arise here. One is to find out how many unique sets of tokens stored in the lists and what is the number of appearances of each unique set of tokens. To solve this problem, identical lists are eliminated that store the same set of tokens of the leaf node b such as $a_1$ and $a_3$ in FIG. 2 and keep counting the number of appearances for each unique list. We recall data values of the leaf node b 13 and replace the tokens in each list by the corresponding data values 17. In this way, we obtain all the unique patterns in field b, associated with unique data values in field a 18, and the number of appearances for each unique pattern.

EXAMPLES

Assume a database in which one field is user ID identifying a cable TV and another field is option channels specifying optional paid channels associated with each cable TV. Assume there are 100,000,000 records and 20,000,000 different user IDs or cable TVS. The total number of different optional paid channels is 100. On average, each user ID has about 5 paid channels. In the case of conditional pattern recognition, there are some 20,000,000 patterns or packages of optional paid channels. Some patterns may be made of up to 100 optional channels, corresponding to the maximum number of the paid channels each cable TV or user ID can order. Others may have as little as one paid channel.

By virtue of this invention, one might find 10,000 unique patterns of optional channels. On average, each pattern may have counts of 2,000 representing the average number of appearances of each pattern. Some patterns may appear as many times as hundreds of thousands of times or even millions. Others may show up only once. Such patterns of information may help to identify what option packages are popular and what are not. Similarly, one may set phone users who switched phone company to be the condition field and find out what patterns are stored in the hashing lists, associated with each switch specified in the condition field.

It will be appreciated by one of skill in the art that the invention is applicable to a broad range of other problems. To take one further example of many, it may be interesting to find out what is the pattern made up of a set of the left child tokens pairing with the same set of right child tokens or the same right child pattern. This is a pattern-pairing-pattern problem. To solve this problem, one needs to store a set of list indices that correspond to the same set of list elements.

We claim:

1. A method of rearranging data within a computer to perform certain query operations, comprising the steps of:

loading the computer with data having two fields corresponding to a left leaf node a having left leaf node tokens relating to left node data values and a right leaf node b having right leaf node tokens relating to right node data values of a tree structure, and wherein the left leaf node has a first immediate ancestor node $n_1$, wherein $n_1$ is an ancestor node of leaf node a, but not of leaf node b, and the right leaf node has a second immediate ancestor node $n_r$, wherein $n_r$ is an ancestor node of leaf node b, but not of leaf node a, locating the immediate ancestor node the left leaf node $n_1$ of $n_a$ of $n_1$, wherein $n_1$ has left ancestor tokens associated therewith;

locating the immediate ancestor node $n_r$ of the right leaf node wherein $n_r$ has right ancestor tokens associated therewith;

recalling the left leaf node tokens to node $n_1$ and recalling the right leaf node tokens to node $n_r$, thereby propagating the left leaf node tokens to node $n_1$ and the right leaf node tokens to node $n_r$;

replacing the left ancestor tokens of node $n_1$ with the recalled left leaf node tokens and replacing the right ancestor tokens of node $n_r$ with the right leaf node tokens to form a plurality of lists;

combining right leaf node tokens that pair with the same left node tokens;

eliminating those of the plurality of lists which store the same right leaf node tokens;

accounting for those of the plurality of the lists which are eliminated; and sorting the remaining elements.

2. A method for identifying unique data values in a computer loaded structured information system having a condition field and an associated pattern field, comprising the steps of:

relating the condition field to a first unique value leaf node having first leaf node tokens relating to first data values, and the pattern field to a second unique value leaf node having second leaf node tokens relating to second data values;

determining a first immediate ancestor of the first unique value leaf node, the first ancestor not also being an immediate ancestor to the second unique value leaf node, wherein the first ancestor has first ancestor tokens;

determining a second immediate ancestor of the second unique value leaf node, such that the second ancestor is not also an immediate ancestor to the first unique value leaf node, wherein the second ancestor has second ancestor tokens;

pairing the first and second ancestor tokens to form a list;

replacing the first ancestor tokens with the first leaf node tokens and the second ancestor tokens with the second leaf node tokens;

replacing the first leaf node tokens in the list with the first data values and the second leaf node tokens with the second data values.

3. The method of claim 2 further comprising the steps of:

eliminating redundant first and second leaf node tokens from the list prior to replacing the first and second leaf node tokens with the first and second data values respectively.

4. The method of claim 3 further comprising the steps of:

eliminating redundant second leaf node tokens and the corresponding first leaf node tokens from the list; and accounting for eliminated token redundancies prior to replacing the first and second leaf node tokens in the list with the first and second data values, respectively.

5. The method of claim 2 wherein the first and second immediate ancestors have a common ancestor node therebetween.

6. The method of claim 2 wherein the step of pairing the first and second ancestor tokens to form a list utilizes a hashing list to store a plurality of the second ancestor tokens with one of the first common ancestor tokens.

* * * * *